United States Patent Office 3,218,304
Patented Nov. 16, 1965

3,218,304
PROCESS FOR THE AFTERTREATMENT
OF POLYOLEFINS
Walter Rottig, Oberhausen-Sterkrade Nord, and Otto
Liethen, Duisburg-Hamborn, Germany, assignors to
Ruhrchemie Aktiengesellschaft, Oberhausen-Holten,
Germany
No Drawing. Filed June 2, 1960, Ser. No. 33,398
Claims priority, application Germany, June 6, 1959,
R 25,690
8 Claims. (Cl. 260—88.2)

The invention relates to an aftertreatment of polyolefins and, more particularly, to such a treatment which substantially lowers their bulk density.

The polymerization of low molecular weight aliphatic olefins, especially ethylene and propylene, when effected by the processes known up to the present, generally yields polyolefins which have a bulk density of more than 200 g./liter, e.g., 300 g./liter, after processing and purification. The bulk density is independent of the type of polymerization process, i.e., regardless whether it is, for example, effected as a high-pressure process under a pressure of between 500 and 1000 atmospheres or as a low-pressure process with catalysts of various compositions.

It has been found, however, that it is possible by an aftertreatment to exert a quite substantial influence on the bulk density. It further has been found that a substantial reduction in the bulk density of polyolefins is obtained by dissolving said polyolefins, especially polyethylene and polypropylene, in an organic solvent at a temperature of between 80° and 200° C., and preferably between 100 and 150° C., with the use of a protective gas atmosphere; separating the polyolefins, if necessary, from undissolved constituents by hot filtration; precipitating the polyolefins by cooling; freeing them carefully from adhering solvent by filtration and displacement, and drying said polyolefins after repeated washing. It is possible by this treatment to produce polyolefins, the bulk density of which is lower by about a power of ten than that of the starting material.

Adapted to be subjected to this process are polyolefins, especially polyethylene, polypropylene and their copolymers, preferably freed in a manner known per se from low molecular weight and/or from atactic compounds, and having any molecular weight ranging from about 10,000 to more than 1,000,000, as determined viscosimetrically in decaline at 135° C. Particularly advantageous in case of polyethylene are molecular weights in excess of 30,000 up to about 250,000 and preferably between 50,000 and about 150,000. The molecular weights when using polypropylene are approximately in the same range. However, as is known, polypropylene does not attain the extremely high molecular weight of polyethylene.

In accordance with the invention, the polyethylene and/or polypropylene produced by a process known per se first is dissolved in a suitable solvent or solvent mixture. Particularly suitable solvents for this purpose are hydrocarbons, i.e., both aromatic and naphthenic and preferably aliphatic straight chain or branched chain hydrocarbons having more than 12 and preferably from 14 to 18 carbon atoms. These hydrocarbons may or may not be hydrogenated, i.e., pure olefins or olefin mixtures may even be used if desired. It is also possible to use single fractions, all molecules of which have the same number of carbon atoms or mixtures comprising molecules having different numbers of carbon atoms and derived from commercial processes such as the Fischer-Tropsch synthesis, refining processes, etc. Further solvents whose use was found particularly favorable are multi-halogenated hydrocarbons, terpenes, ethers, esters and ketones. The addition of suitable inhibitors to the solvent is likewise advantageous.

The polymers are dissolved at a temperature between about 80° and 200° C., and preferably between 100° and 150° C., in the solvent or solvent mixture. The temperature used in dissolving the polymer is not without influence on the bulk density of the finished product. The dissolving temperatures advantageous to obtain low bulk densities range between 120° and 160° C. for polyethylene and between 140 and 150° C. for polypropylene. The dissolving process is promoted by first slurrying the polymer with part of the solvent or with a different solvent at a temperature of below 100° C. and only then adding the bulk of the solvent. While heating to the temperature desired, it is opportune to pass a suitable protective gas, such as nitrogen, through the solvent to displace any oxygen present. All of the subsequent operational measures are likewise advantageously effected under a protective gas atmosphere. The concentration of the polymer in the solvent is of great importance since the bulk density of the polymer subjected to the treatment in accordance with the invention is largely influenced by the concentration during the dissolving procedure. For this reason, the concentration in dissolved state should not be higher than about 50 grams per liter, and should preferably be less than about 25 g./l. Normally, the concentration will be reduced as the molecular weight increases.

After solution and subsequent hot filtration to remove any present undissolved constituents, the solution is slowly cooled. In general, the time required for cooling is between about 0.5 and 10 hours, and preferably between 2 and 7 hours.

Upon termination of cooling, the polymer has precipitated and must now be freed from solvent adhering thereto. First of all, excess solvent is removed by filtration. It has been found that it is necessary to exclude the use of pressure, if possible, in this filtration step to avoid a more or less high increase in bulk density caused by the pressure. Accordingly, the filtration of the polymer will always be effected at only slight superatmospheric or subatmospheric pressure, or preferably at atmospheric pressure.

Considerable quantities of solvent which also must be removed are left in the highly swollen polymer even after removal of the excess solvent. The use of organic oxygen-containing compounds e.g., of straight chain or branched chain aldehydes, ketones, or esters and preferably of aliphatic low molecular weight alcohols containing from 1 to about 5, and preferably from 2 to 4 carbon atoms, has been found to be advantageous for this purpose. In selecting the oxygen-containing compounds to be used for the displacement of the solvent, only such liquids which do not form an azeotropic mixture with the solvent should be chosen. Moreover, the further course of the treatment will be facilitated if the oxygen-containing compounds used as displacing agents do not form azeotropic mixtures with water or, at the most, form boiling mixtures with only small amounts of water. The quantity of displacing or extracting agent used for the removal of the solvent is approximately 100 to 300 times and preferably 25 to 150 times the dry weight of the polyolefin charged. The extraction may be effected with moderate heating, temperatures between 15 and 50° C. generally being sufficient.

The residual hydrocarbons or other solvents may be dissolved by a conventional treatment with the oxygen-containing compounds mentioned above, e.g., by suspending and stirring, countercurrent treatment or other measures known in the art, it being preferable under certain conditions to maintain a temperature above room temperature. In cases involving repeated washing, this elevated temperature is to be used in the last washing step. It has been found that some influence on the condition of the finished product also is exerted by the period of stirring and the agitator speed. In extracting low molecular weight polyolefins, the speed of the stirrer should be lower and the period of stirring shorter than in extracting higher molecular weight polyolefins. The removal of solvent from the polyolefins can be considered complete and is to be discontinued when the concentration of solvent in the extracting or washing medium is less than 5 percent, and preferably less than 1 percent.

Normally, a single extraction or washing operation will not suffice to effect approximately complete removal of residual solvents. It, therefore, is necessary, to repeat the washing procedure since as complete a removal as possible is indispensable for obtaining a low bulk density.

If desired, suitable inhibitors can be incorporated in the polymer with the solvent during these operations. Following this treatment, the washing or displacing medium last used, e.g., a low molecular weight alcohol, is removed by single-stage or multi-stage washing with water. The quantity of water to be used for removing the extracting agent is approximately 10 to 300 times, and preferably 30 to 150 times, the dry weight of the polyolefin charged. It is favorable in many cases to allow the suspension, obtained after the first treatment with water, to stand for some time before continuing the treatment. This time of standing may be from 1 to 48 hours and, with particular advantage, from 2 to 12 hours. Washing with water may be promoted by moderate heating, the use of a temperature of between 50 and 60° C. being sufficient in most cases. There is obtained in this manner a largely dried finished product floating as a layer on the water, which easily and simply is separated from the water. If necessary or desired, aqueous solutions, to which anionic or cationic wetting agents are added, may be used in place of organic solvents for the removal of the hydrocarbons. Moreover, the two modes of operations may be combined.

A further possibility of removing the displacing or extracting liquid is to add 10 to 100 percent water, based on the weight of the polymer, to the filtered polymer which is moist with solvent and to evaporate the bulk of the water while stirring and/or while passing through an inert gas and applying a vacuum of 100 to 600 mm. Hg absolute, and preferably of 200 to 500 mm. Hg absolute, and a temperature between 30 and 80° C., and preferably between 40 and 70° C. Here again, a finished product will be obtained which is largely dry, floating as a layer on the water.

The polymer which is now largely free from solvent but still contains certain amounts of organic and/or aqueous constituents is then dried. This drying preferably is effected under vacuum between 20 and 250 mm. Hg and at temperatures which range between 20 and 150° C., but not higher than about 20° C. below the softening or melting temperature of the particular polymer. It is essential to the drying that the layer depth of the polymer does not exceed 5 centimeters.

The process of the invention also is applicable to those starting products which are obtained immediately after the polymerization without a purifying operation and to which suspending agent still adheres. Excellent results also are obtainable with these polyolefins.

The quantities of solvents, extracting agents and wash water required for carrying out the process can be reduced considerably by recycling these liquids.

The process of the invention results in finished products, whose bulk density is lower up to more than a power of ten than that of the particular starting product. Due to their characteristics which are unobjectionable from the physiological point of view, the relatively high melting points and the other properties known from literature, the products produced in accordance with the invention, for example, may be successfully used as heat insulators or as insulators in refrigeration. However, still other uses are possible such as, for example, flame spraying, fluid sintering, etc.

The invention now will be more fully explained by the following examples. However, it should be understood that these are given merely by way of illustration, not of limitation, and that numerous changes may be made in the details without departing from the spirit and the scope of the invention as hereinafter claimed.

*Example 1*

1500 ml. technical cetane (boiling range, 281 to 298° C.) and 20 g. polypropylene having a bulk density of 265 grams per liter and a weight, after tapping, of 330 g./l. were introduced into a clean and dry 5 liter-three-necked flask equipped with a stirrer, a reflux condenser with a bubble counter mounted thereon, a thermometer and a gas inlet pipe for an inert gas.

The polypropylene had been prepared with crystalline $TiCl_3$ and aluminum diethyl monochloride under a pressure of 3 kg./cm.$^2$, at a temperature of 50° C. and with the use of hydrogenated tetrameric propylene as the suspending agent. To remove atactic compounds and to reduce the ash content in the polymer, the crude polymer had been treated in the presence of heat with a mixture of heptane, isopropanol and hydrochloric acid (91.5:8:0.5) and the residue had been dried under vacuum in a nitrogen atmosphere.

The mixture of polypropylene and cetane was heated to 130° C. while stirring. Thereby, the polymer dissolved and the viscosity of the solution increased. A clear solution formed. Heating and stirring were discontinued and the solution was allowed to cool at room temperature. While cooling, voluminous polymer was precipitated. The cold solution was filtered at atmospheric pressure through a folded filter. The moist filter residue was returned into the three-necked flask and suspended in 1 liter tetrahydrofurane. The suspension was transferred into the cartridge of an extractor. After an extraction period of 15 hours, the contents of the cartridge were mixed with 1 liter water, and this mixture comminuted for 5 minutes in a high-speed stirrer. This mixture was subjected to suction filtration, effected under a vacuum of 550 mm. Hg and at 50° C. while stirring and passing a slow nitrogen current through. After 30 minutes, the polymer was floating as a layer on the water. The lower layer was drained at atmospheric pressure. The product was dried at 60° C. and at 40 mm. Hg under a nitrogen atmosphere, and the dried product was screened through a sieve of 1 mm. mesh-size. The finished product had a bulk density of 27 g./l. and a tapping weight of 39 g./l., tapping weight being the apparent density of the material after tapping against the container wall.

*Example 2*

20 g. atmospheric pressure polyethylene having a bulk density of 1,000,000, determined viscosimetrically at 135° C. in decaline, were dissolved at 145° C. in 7.5 liters technical cetane in the presence of N-phenyl-N'-cyclohexyl-p-phenylene diamine as an age resister while stirring. Further processing was the same as in Example 1. The finished product had a bulk density of 23 g./l. and a tapping weight of 40 g./l.

*Example 3*

10 g. polyethylene having a molecular weight of 40,000 were dissolved in 1500 ml. butyl bromide at boiling temperature. Further processing was the same as in Example 1 except that ethanol was used for washing out the solvent. The finished product had a bulk density of 25 g./l. and a tapping weight of 31 g./l.

*Example 4*

30 g. polyethylene having a molecular weight of 1,000,000, determined viscosimetrically, are dissolved at 160° C. in 1.5 liters unhydrogenated tetrameric propylene. Upon cooling and removal of excess tetrameric propylene, the adhering solvent is removed by repeated treatment with acetone at room temperature, and thereafter the acetone is dissolved out with water also at room temperature. The product obtained after drying at 100° and subsequent screening using a sieve of 1 mm. mesh size has a bulk density of 23 g./l. and a tapping weight of 45 g./l.

*Example 5*

1350 ml. perchloroethylene are filled into the apparatus described in Example 1 and heated to 60° C. At this temperature, a mixture of 9 g. polyethylene, having a molecular weight of 1,200,000, determined viscosimetrically, in decaline at 135° C., and produced with the use of Ziegler-Natta-catalysts and having a bulk weight of 210 g./l. and a tapping weight of 295 g./l. with 150 ml. perchloroethylene is added while stirring. The flask is heated to the boiling temperature of perchloroethylene. The polyethylene is dissolved after 3 to 5 minutes. Heating and stirring are discontinued and the solution is allowed to cool whereupon the polymer precipitates in voluminous form.

The cold suspension is subjected to suction filtration at 500 mm. Hg. The filter residue, together with 1500 ml. ethanol, is treated for 30 seconds with a high-speed stirrer at 9000 r.p.m. The suspension obtained is subjected to suction filtration. The filter residue is mixed with 1500 ml. ethanol and again treated for 30 seconds with a high-speed stirrer at 9000 r.p.m. This is followed by filtering the resultant mixture; treating the filter residue together with 1500 ml. water for 30 seconds with the high-speed stirrer at 9000 r.p.m.; separating the lower phase from the resultant mixture in a separatory funnel; mixing the residue with 1500 ml. water and shaking this mixture until the polymer floats on the water as a layer. The aqueous phase is drained, and the polyolefin spread as a thin layer in a drying cabinet and dried at 90° C. and 380 mm. Hg. under a nitrogen atmosphere. The dry powder is screened through a sieve of 1 mm. mesh size. The polyethylene thus processed has a bulk density of 26 g./l. and a tapping weight of 43 g./l.

*Example 6*

1350 ml. turpentine (alpha-pinene fraction) to which N - phenyl - N' - cyclohexyl - p - phenylene diamine in an amount fitting a spatula tip is added, are filled into the apparatus described in Example 1, heated to 70° C., and then a mixture of 6 g. polyethylene (molecular weight, 1,000,000) and 150 ml. turpentine is added. The polyolefin is dissolved at 140° C. It is allowed to to cool and is then further processed by the procedure described in Example 5. The product obtained has a bulk density of 21 g./l. and a tapping weight of 27 g./l.

*Example 7*

Two separate portions each of 20 g. polyethylene (molecular weight 50,000) are dissolved at 125° C. in 1.5 liters tetrameric propylene in the presence of a spatula tip full of N-phenyl-N'-cyclohexyl-p-phenylene diamine in the apparatus described in Example 1, and the solutions are poured into shallow dishes for cooling. The two cool solutions are subjected to suction filtration at 600 mm. Hg. The filter residue is transferred into a cylindrical 5 liter-glass closed with an aluminum cover equipped with a stirrer having a perforated blade. 1.5 liters acetone are introduced through an opening in the cover and the stirrer is operated for 1 minute at a speed of 1300 to 1500 r.p.m. The resultant suspension is subjected to suction filtration and the filter residue again is stirred for 1 minute with 1.5 liters acetone at 1300–1500 r.p.m. in the glass. The latter treatment is again repeated with the filter residue sucked off. The suspension obtained is subjected to suction filtration under a slight vacuum and the residue is stirred for 1 minute with 2 liters water at 1300 to 1500 r.p.m. in a cylindrical glass. The lower aqueous layer is separated in a separatory funnel and the residue is shaken twice with 2 liters water. The product floating on the water is dried and screened. It has a bulk density of 25 g./l. and a tapping weight of 36 g./l.

*Example 8*

The product obtained in Example 7 is combined, divided into three parts and dried at different layer depths at 100° C. drying cabinet temperature and at atmospheric pressure while passing through 100 l./hr. $N_2$. The bulk densities and tapping weights of the dried and screened polyethylene are shown in the followed table:

| Layer depth, cm. | Bulk density, grams/liter | Tapping weight, grams/liter |
| --- | --- | --- |
| 4–4.5 | 38 | 54 |
| 3–3.5 | 30 | 43 |
| 1–1.5 | 25 | 36 |

*Example 9*

The atactic components are extracted, in the presence of heat, with heptane from a copolymer produced from a gas comprising 10 parts by volume of ethylene and 1 part by volume of propylene at 70° C. in a hydrogenated oxygen-free Diesel oil, and the residue obtained is dried in vacuo at 70° C. Ten grams of this dried residue are slurried with 150 ml. perchloroethylene, and the slurry is added at 30° C. to 1350 ml. perchloroethylene contained in the apparatus described in Example 1, and the mixture is heated to 110° C. At this temperature, the copolymer dissolves. The precipitate obtained by cooling is subjected to suction filtration at 500 mm. Hg, and the residue is treated twice with 1 liter ethanol and subsequently once with 1 liter water in a device with high speed stirrer for 1 minute each time at a speed of 9000 r.p.m. Upon separation of the lower (aqueous) phase, the residue is shaken with 1 liter water. The polymer floating on the water is dried at 90° C. and at 60 mm. Hg. The dried and screened finished product has a bulk density of 25 g./l. and a tapping weight of 42 g./l.

*Example 10*

5 g. polyethylene, having a molecular weight of 40,000, and 5 g. polyethylene, having a molecular weight of 1,000,000, (both molecular weights determined viscosimetrically at 135° C. in decaline) are dissolved in perchloroethylene using the conditions of Example 1. In further processing, the procedure of Example 9 is followed except that the high-speed stirrer is operated at 6000 r.p.m. The finished product obtained has a bulk density of 29 g./l. and a tapping weight of 46 g./l.

We claim as our invention:

1. A process for the reduction of the bulk density of polyolefin, after completed polymerization, to substantially 21 to 38 grams per liter, which comprises dissolving substantially 0.6 to 50 grams of said polyolefins in one liter organic solvent at a temperature of approximately 80 to 200° C. with the use of a protective gas atmosphere; separating undissolved constituents by hot filtration at substantially atmospheric pressure; cooling the solution, while maintaining the original concentration, for 0.5 to 10 hours to effect precipitaiton of the polyolefins; freeing said polyolefins from the bulk of said solvent by filtration; removing adhering residual solvent by displacement with an oxygen-containing liquid organic compound; removing said oxygen-containing liquid organic compound by repeated washing with water; and drying the polyolefins in layers of 1 to 5 cm. depth in vacuo and under a protective gas atmosphere at temperatures between 20 and 150° C., but not higher than 20° C. below the softening point of said polyolefins.

2. A process for the reduction of the bulk density of polyolefins, after completed polymerization, to substantially 23 to 38 grams per liter, which comprises dissolving 25 to 50 grams of said polyolefins in one liter of an organic solvent, selected from the group consisting of straight-chain and branched-chain aromatic, naphthenic and aliphatic hydrocarbons, terpenes, ethers, esters and ketones, at a temperature of approximately 80 to 200° C. with the use of a protective gas atmosphere; separating undissolved constituents by hot filtration substantially at atmospheric pressure; cooling the solution for 0.5 to 10 hours to effect precipitation of the polyolefins; freeing said polyolefins from the bulk of the solvent by filtration substantially at atmospheric pressure; removing adhering residual solvent by displacement with 25 to 300 times the dry weight of said polyolefins of an oxygen-containing liquid, selected from the group consisting of an aliphatic alcohol having 1 to 5 carbon atoms in its molecule, an aldehyde, ketone, and mixtures thereof, at a temperature of substantially 15 to 50° C., removing the oxygen-containing liquid by repeated washing with water in amounts of substantially 10 to 300 times the dry weight of said polyolefins and allowing the solution to stand for 1 to 48 hours between the first wash and the ensuing one; and drying the polyolefins in layers of 1 to 5 cm. depth in vacuo and under a protective gas atmosphere at a temperature between approximately 20 and 150° C., but not higher than 20° C. below the softening point of said olefins.

3. The process according to claim 1, wherein said polyolefins, after cooling and precipitation, are freed from adhering solvent by displacement, using as displacement agent an oxygen-containing substance selected from the group consisting of an alcohol, aldehyde, ketone, ether and mixtures thereof.

4. The process according to claim 3, wherein the oxygen-containing substances used for extraction of the polyolefins precipitated from the solution are removed by washing with water.

5. The process according to claim 1, wherein filtration of the extracted polymer is effected at a slight superatmospheric pressure.

6. The process according to claim 1, wherein filtration of the extracted polymer is effected at a slightly reduced pressure.

7. The process according to claim 1, wherein said polyolefin is derived from a synthesis using a suspending agent, residues of said suspending agent still adhering to said polyolefin.

8. The process according to claim 1, wherein said solvent is selected from the group consisting of straight-chain and branched-chain aromatic, naphthenic and aliphatic hydrocarbons having 14–18 carbon atoms, mixtures thereof, multihalogenated hydrocarbons, terpenes, ethers, esters and ketones.

References Cited by the Examiner
UNITED STATES PATENTS

| | | | |
|---|---|---|---|
| 2,628,172 | 2/1955 | Jenett | 260—94.9 |
| 2,825,721 | 3/1958 | Hogan et al. | 260—94.9 |
| 2,886,561 | 5/1959 | Reynolds et al. | 260—94.9 |
| 2,943,083 | 6/1960 | Kolling et al. | 260—94.9 |
| 2,964,516 | 12/1960 | Henderson | 260—94.9 |
| 3,055,879 | 9/1962 | Wride | 260—94.9 |
| 3,073,810 | 1/1963 | Ross | 260—94.9 |

JOSEPH L. SCHOFER, *Primary Examiner.*

L. H. GASTON, MORRIS LIEBMAN, WILLIAM H. SHORT, *Examiners.*